United States Patent
Ko et al.

(10) Patent No.: US 8,743,824 B2
(45) Date of Patent: Jun. 3, 2014

(54) METHOD AND APPARATUS FOR TRANSMITTING/RECEIVING A SIGNAL IN A WIRELESS COMMUNICATION SYSTEM THAT SUPPORTS MULTI-USER MIMO TRANSMISSION

(75) Inventors: Hyun Soo Ko, Anyang-si (KR); Jae Hoon Chung, Anyang-si (KR); Bin Chul Ihm, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 123 days.

(21) Appl. No.: 13/388,425
(22) PCT Filed: Aug. 26, 2010
(86) PCT No.: PCT/KR2010/005729
§ 371 (c)(1), (2), (4) Date: Feb. 1, 2012
(87) PCT Pub. No.: WO2011/025278
PCT Pub. Date: Mar. 3, 2011

(65) Prior Publication Data
US 2012/0134338 A1    May 31, 2012

Related U.S. Application Data

(60) Provisional application No. 61/236,892, filed on Aug. 26, 2009.

(30) Foreign Application Priority Data

Aug. 26, 2010 (KR) ........................ 10-2010-0082774

(51) Int. Cl.
*H04W 4/00* (2009.01)
*H04B 1/38* (2006.01)
*H04K 1/10* (2006.01)
(52) U.S. Cl.
USPC ............ 370/330; 370/328; 375/221; 375/260
(58) Field of Classification Search
CPC ................................................ H04W 72/0446
USPC ................... 370/328, 329, 330; 375/221, 260
See application file for complete search history.

(56) References Cited

U.S. PATENT DOCUMENTS

2008/0013610 A1*  1/2008  Varadarajan et al. .......... 375/221
2008/0232494 A1*  9/2008  Pan et al. ....................... 375/260

FOREIGN PATENT DOCUMENTS

EP          2 056 515 A1    5/2009

OTHER PUBLICATIONS

ETSI TS 136 213 V8.5.0, "LTE; Evolved Universal Terrestrial Radio Access (E-UTRA); Physical layer procedures (3GPP TS 36.213 version 8.5.0 Release 8)", Feb. 2009.
G. Auer, et al., "Pilot Design for Multi-User MIMO", IEEE International Conference on Acoustics, Speech and Signal Processing 2009 (ICASSP 2009), pp. 3621-3624, Apr. 24, 2009.
H.G. Myung, "Technical Overview of 3GPP LTE", May 18, 2008, p. 33-p. 37.

* cited by examiner

*Primary Examiner* — Ian N Moore
*Assistant Examiner* — Kiet Tang
(74) *Attorney, Agent, or Firm* — McKenna Long & Aldridge LLP

(57) ABSTRACT

The present invention relates to a wireless communication system, and discloses a method and apparatus for transmitting/receiving a signal in a wireless communication system that supports multi-user MIMO transmission. According to one embodiment of the present invention, a method in which a mobile station receives a signal in a wireless communication system that supports multi-user MIMO transmission, comprises: a step of receiving information on the entirety of the transmission rank of the multi-user MIMO transmission; a step of receiving a reference signal and data for demodulation for the mobile station on the basis of the information on the entirety of the transmission rank; a step of acquiring channel information on the mobile station from the reference signal for demodulation; and a step of demodulating said data on the basis of the acquired channel information.

8 Claims, 8 Drawing Sheets

METHOD AND APPARATUS FOR TRANSMITTING/RECEIVING A SIGNAL IN A WIRELESS COMMUNICATION SYSTEM THAT SUPPORTS MULTI-USER MIMO TRANSMISSION

This application is a 35 U.S.C. §371 National Stage entry of International Application No. PCT/KR2010/005729, filed on Aug. 26, 2010, and claims the benefit to and of U.S. Provisional Application No. 61/236,892 filed on Aug. 26, 2009 and Korean Application No. 10-2010-0082774, filed Aug. 26, 2010, all of which are incorporated by reference in their entirety herein.

FIELD OF THE INVENTION

The present invention relates to a wireless communication system and, more particularly, to a method and apparatus for transmitting/receiving a signal in a wireless communication system that supports multi-user MIMO transmission.

BACKGROUND ART

A Multiple Input Multiple Output (MIMO) system refers to a system that can enhance transmission and reception efficiency of data by using multiple transmitting antennae and multiple receiving antennae. The MIMO technology includes a Spatial diversity technique and a Spatial multiplexing technique. The Spatial diversity technique may increase transmission reliability through a diversity gain or may widen a cell range. Thus, the Spatial diversity technique is suitable for data transmission with respect to a user equipment moving at a high speed. And, by transmitting data simultaneously, the Spatial multiplexing technique may increase the data transmission rate without increasing the system bandwidth.

In the MIMO system, each transmitting antenna has an independent data channel. The transmitting antenna may signify a virtual antenna or a physical antenna. A reception subject may estimate a channel with respect to each transmitting antenna of a transmission subject, thereby being capable of receiving data transmitted from each transmitting antenna. Channel estimation refers to a process of recovering a received signal by compensating for a distortion in a signal, which is caused by fading. Herein, fading refers to an effect wherein the intensity of a signal is changed abruptly due to a multi path-time delay in a wireless telecommunications system environment. In order to perform channel estimation, a reference signal commonly known by the transmission subject and the reception subject is required. A reference signal may also simply be referred to as an RS (Reference Signal) or may also be referred to as a Pilot depending upon the applied standard.

Among the diverse downlink reference signals, a user equipment (UE)-specific DMRS (Demodulation RS) for data demodulation is defined. When performing multi-user-MIMO (MU-MIMO), the UE-specific DMRS may be used. Each user equipment may use channel information that is received (or acquired) through a precoding-based DMRS, so as to perform MU-MIMO operations without any interference with other user equipments.

DETAILED DESCRIPTION OF THE INVENTION

Technical Objects

In a MU-MIMO transmission supporting multiple layers, an overhead of a DMRS and a position of the DMRS over a resource block may vary depending upon the transmission rank. In case a user equipment performing MU-MIMO operations is unaware of the presence of other user equipments performing MU-MIMO operations along with the corresponding user equipment, the corresponding user equipment may misinterpret a position over a resource block that is allocated for the DMRS respective to another user equipment as a position allocated to the corresponding user equipment in order to perform data transmission. Thus, a malfunction may occur during the data demodulation process.

Therefore, a technical object of the present invention is to provide a method and apparatus for supporting MU-MIMO transmission supporting multiple layers so that each user equipment can operate correctly.

Technical Solutions

In order to achieve the technical object of the present invention, according to an exemplary embodiment of the present invention, a method for receiving a signal by a user equipment in a wireless communication system supporting multi-user MIMO transmission includes the steps of receiving information on a total transmission rank of the multi-user MIMO transmission; receiving a demodulation reference signal and data respective to the user equipment based upon the information on the total transmission rank; receiving channel information on the user equipment from the demodulation reference signal; and demodulating the data based upon the received channel information.

Also, the step of receiving a demodulation reference signal and data may include deciding a position within a time-frequency domain, to which the demodulation reference signal and data respective to the user equipment are transmitted, from the information on the total transmission rank.

Also, the method may further include the steps of receiving a layer indicator allocated to the user equipment; and receiving information on a transmission rank respective to the user equipment.

Also, wherein the step of receiving a demodulation reference signal and data may include deciding a demodulation reference signal respective to a layer valid to the user equipment, based upon the layer indicator and the information on the transmission rank respective to the user equipment.

In order to achieve the technical object of the present invention, according to another exemplary embodiment of the present invention, a method for transmitting a signal by a base station in a wireless communication system supporting multi-user MIMO transmission includes the steps of transmitting information on a total transmission rank of the multi-user MIMO transmission to multiple users; and transmitting a demodulation reference signal and data respective to each of the multiple users. Herein, the information on the total transmission rank is used by each of the multiple users for receiving the demodulation reference signal and the data, and for receiving channel information from the demodulation reference signal, so as to demodulate the received data.

Also, the method may further include the steps of transmitting a layer indicator allocated to each of the multiple users; and transmitting information on a transmission rank respective to each of the multiple users.

In order to achieve the technical object of the present invention, according to yet another exemplary embodiment of the present invention, a user equipment receiving a signal in a wireless communication system supporting multi-user MIMO transmission includes a receiving module configured to receive a downlink signal from a base station; a transmitting module configured to transmit an uplink signal to the base station; and a processor configured to be connected to the receiving module and the transmitting module, so as to control operations of the user equipment including the receiving module and the transmitting module. Herein, the processor may perform control operations through the receiving module, so as to receive information on a total transmission rank of the multi-user MIMO transmission, and to receive a demodulation reference signal and data respective to the user equipment based upon the information on the total transmission rank, and may perform control operations so as to receive channel information on the user equipment from the demodulation reference signal, and to demodulate the data based upon the received channel information.

In order to achieve the technical object of the present invention, according to a further exemplary embodiment of the present invention, a base station transmitting a signal in a wireless communication system supporting multi-user MIMO transmission includes a receiving module configured to receive an uplink signal from a user equipment; a transmitting module configured to transmit a downlink signal to the user equipment; and a processor configured to be connected to the receiving module and the transmitting module, so as to control operations of the base station including the receiving module and the transmitting module. Herein, the processor may perform control operations through the transmitting module, so as to transmit information on a total transmission rank of the multi-user MIMO transmission to multiple users, and to transmit a demodulation reference signal and data respective to each of the multiple users. Also, the information on the total transmission rank may be used by each of the multiple users for receiving the demodulation reference signal and the data, and for receiving channel information from the demodulation reference signal, so as to demodulate the received data.

The above-described general description of the present invention and the detailed description that will follow are merely exemplary and are, therefore, given to provide additional description of the appended claims of the present invention.

Effects of the Invention

According to the above-described exemplary embodiments of the present invention, a method and apparatus for supporting the correct operation of each user equipment may be provided.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BEST MODE FOR CARRYING OUT THE PRESENT INVENTION

Figure 1:
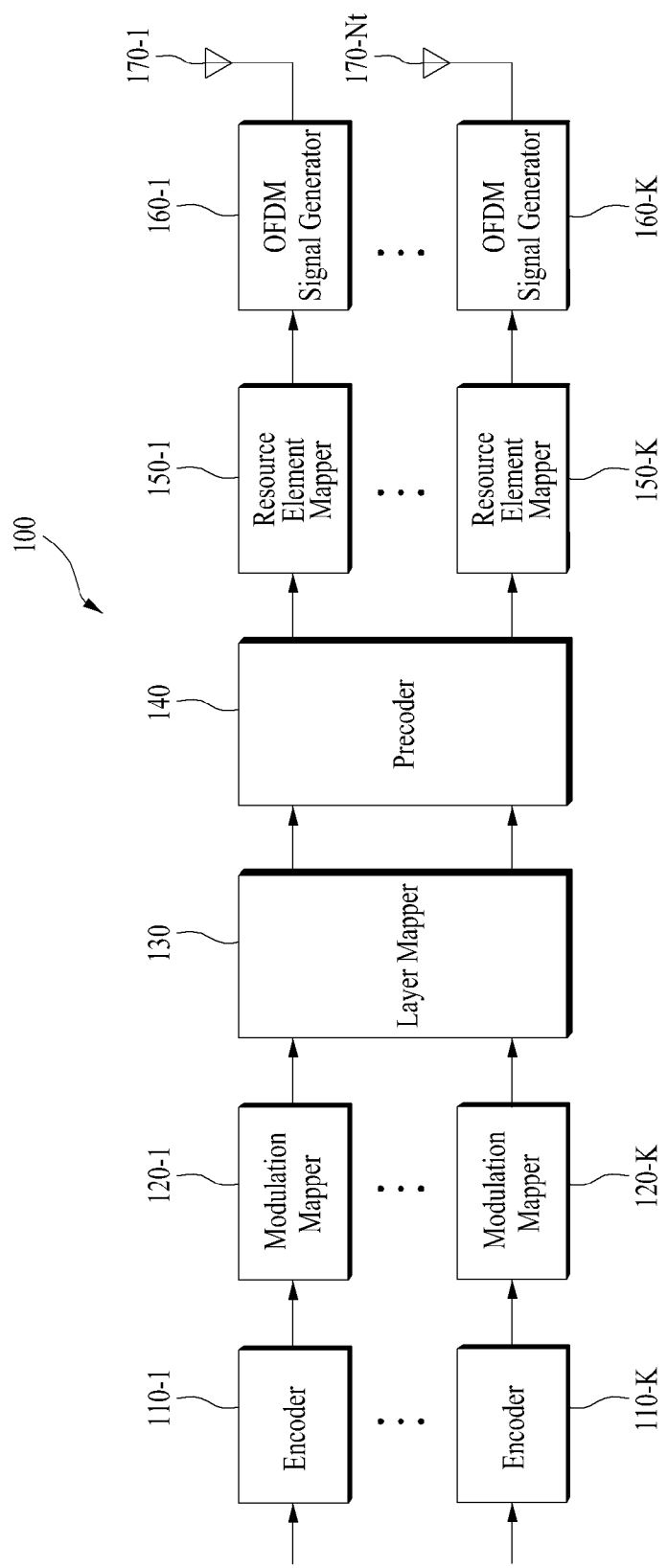
FIG. 1 illustrates a block view showing a structure of a transmitter equipped with multi-antennae.

The embodiments of the present invention described below correspond to a predetermined form of assembly of the elements and characteristics of the present invention. If not mentioned otherwise, each element or characteristic of the present invention may be selectively considered. Also, each element or characteristic of the present invention may also be embodied without being assembled or combined with other elements or characteristics of the present invention. Furthermore, the embodiments of the present invention may be configured by assembling or combining part of the elements and/or characteristics of the present invention. The order of the operations described in the embodiments of the present invention may be altered. And, some of the elements or characteristics of any one embodiment of the present invention may be included in any other embodiment, or may replace the respective element or characteristic of the other embodiment of the present invention.

The specification of the present invention mainly describes the data-transmission and data-reception relation between a base station and a terminal. Herein, the base station has its significance as a terminal node of a network directly performing communication with the terminal. In the description of the present invention, specific operations described to be performed by the base station may also be, in some occasion, performed by an upper node of the base station.

More specifically, it will be apparent that, in a network configured of multiple network nodes, a variety of operations performed in the network in order to communicate with the terminal may be performed by the base station or by other network nodes that do not belong to the base station. At this point, the term 'BS (Base Station)' may also be replaced with other terms, such as a fixed station, Node B, eNode B (eNB), AP (Access Point), and so on. Also, the term 'relay' may be replaced with other terms, such as a Relay Node (RN), a Relay Station (RS), and so on. Furthermore, the term 'Terminal' may be replaced with other terms, such as UE (User Equipment), MS (Mobile Station), MSS (Mobile Subscriber Station), SS (Subscriber Station), or mobile terminal.

The specific terms used in the following description of the present invention are provided to facilitate the understanding of the present invention. And, therefore, without deviating from the technical scope and spirit of the present invention, such specific terms may also be varied and/or replaced by other terms.

In some cases, in order to avoid any ambiguity in the concept (or idea) of the present invention, some of the structures and devices disclosed (or mentioned) in the present invention may be omitted from the accompanying drawings of the present invention, or the present invention may be illustrated in the form of a block view focusing only on the essential features or functions of each structure and device. Furthermore, throughout the entire description of the present invention, the same reference numerals will be used for the same elements of the present invention.

The embodiments of the present invention may be supported by standard documents disclosed in at least one of the wireless access systems, the 802 system, the 3GPP system, the 3GPP LTE system, and the 3GPP2 system. More specifically, among the embodiments of the present invention, steps or part of the present invention that have not been described in order to clearly disclose the technical scope and spirit of the present invention, may be supported by the above-mentioned documents. All terms disclosed in the description of the present invention may be described by the above-mentioned documents.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolved version of the 3GPP LTE system. The WiMAX may be described based upon the IEEE 802.16e standard (WirelessMAN-OFDMA Reference System) and the evolved IEEE 802.16m standard (WirelessMAN-OFDMA Advanced system). For the clarity in the description of the present invention, the present invention will be described based upon the 3GPP LTE system and the LTE-A system. Nevertheless, the scope and spirit of the present invention will not be limited only to those of the 3GPP LTE system and the 3GPP LTE-A system.

In the following description of the present invention, when performing MIMO transmission, a 'Rank' indicates a number of paths that may independently transmit signals, and a 'number of layers' indicates a number of signal streams being transmitted through each path. Generally, since a transmitting end transmits a number of layers corresponding to a number of ranks being used for signal transmission, unless mentioned otherwise, a rank may have the same meaning as a number of layers.

FIG. 1 illustrates a block view showing a structure of a transmitter equipped with multi-antennae.

Referring to FIG. 1, a transmitter (100) includes encoders (110-1, ..., 110-K), modulation mappers (120-1, ..., 120-K), a layer mapper (130), a precoder (140), resource element mappers (150-1, ..., 150-K), and OFDM signal generators (160-1, ..., 160-K). The transmitter (100) also includes Nt number of transmission antennae (170-1, ..., 110-Nt).

The encoder (110-1, ..., 110-K) encodes inputted data based upon a decided coding method, so as to configure coded data. The demodulation mapper (120-1, ..., 120-K) maps the coded data to respective modulation symbols, which indicate positions within a signal constellation. There is no limitation in the modulation scheme, and the modulation scheme may correspond to m-PSK (m-Phase Shift Keying) or m-QAM (m-Quadrature Amplitude Modulation). For example, m-PSK may correspond to BPSK, QPSK, or 8-PSK. And, m-QAM may correspond to 16-QAM, 64-QAM, or 256-QAM.

The layer mapper (130) defines the layer of the modulation symbol so that the precoder (140) can be capable of distributing antenna-specific symbols to the paths of each antenna. The layer is defined as an information path being inputted to the precoder (140). The information path prior to the precoder (140) may also be referred to as a virtual antenna or a layer.

The precoder (140) processes modulation symbols by using a MIMO scheme respective to the multiple transmission antennae (170-1, ..., 170-Nt), thereby outputting antenna-specific symbols. The precoder (140) distributes the antenna-specific symbols to the resource element mapper (150-1, ..., 150-K) of the path respective to the corresponding antenna. Each information path that is sent to a respective antenna by the precoder (140) may be referred to as a stream. This may also be referred to as a physical antenna.

The resource element mapper (150-1, ..., 150-K) allocates each of the antenna-specific symbols to an adequate resource element and, then, multiplexes the allocated antenna-specific symbols with respect to a specific user. The OFDM signal generator (160-1, ..., 160-K) modulates the antenna-specific symbols by using the OFDM scheme, so as to output OFDM symbols. The OFDM signal generator (160-1, ..., 160-K) may perform IFFT (Inverse Fast Fourier Transform) on the antenna-specific symbols. And, a CP (cyclic prefix) may be inserted in each time domain symbol, which is processed with IFFT. The CP corresponds to a signal that is inserted in a guard interval in order to eliminate (or remove) inter-symbol interference caused by the multiple paths when performing OFDM transmission. The OFDM symbol are respective transmitted through each of the transmission antennae (170-1, ..., 170-Nt).

Figure 2:
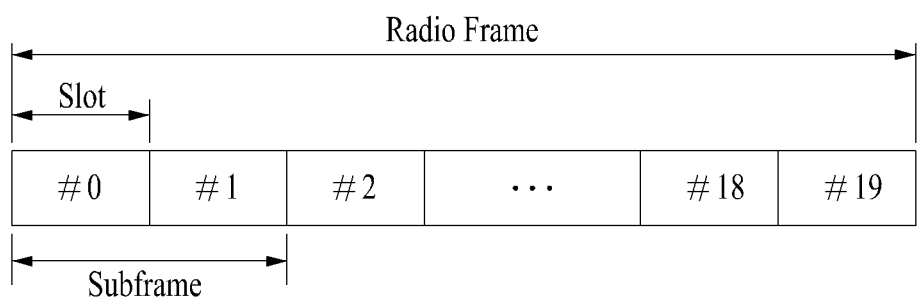
FIG. 2 illustrates a drawing showing a structure of a downlink radio frame.

FIG. 2 illustrates a drawing showing a structure of a downlink radio frame. Referring to FIG. 2, a downlink radio (or wireless) frame is configured of 10 subframes, and one subframe is configured of 2 slots in a time domain. A downlink radio frame may be configured by FDD (frequency division duplex) or TDD (time division duplex). The time consumed (or taken) for one subframe to be transmitted is referred to as a TTI (transmission time interval), and, for example, the length of one subframe may be equal to 1 ms, and the length of one slot may be equal to 0.5 ms. One slot includes a plurality of OFDM symbols in a time domain and includes a plurality of Resource Blocks (RBs) in a frequency domain.

The number of OFDM symbols included in one slot may vary depending upon the configuration of a CP. The CP may be divided into an extended CP and a normal CP. For example, in case the OFDM symbol is configured of a normal CP, the number of OFDM symbols included in one slot may be equal to 7. And, in case the OFDM symbol is configured of an extended CP, since the length of an OFDM symbol is increased, the number of OFDM symbols included in one slot is smaller than when the OFDM symbol is configured of a normal CP. In case of the extended CP, for example, the number of OFDM symbols included in one slot may be equal to 6. In case the user equipment is moving at high speed, or in case the channel status is unstable, the extended CP may be used in order to further reduce the interference between symbols.

In case of the usage of a normal CP, since one slot includes 7 PFDM symbols, one subframe includes 14 OFDM symbols. At this point, the first 2 or 3 OFDM symbols of each subframe are allocated to a PDCCH (physical downlink control channel), and the remaining OFDM symbols may be allocated to a PDSCH (physical downlink shared channel).

The structure of the radio frame is merely exemplary. And, therefore, the number of subframes included in the radio frame or the number of slots included in a subframe, and the number of symbols included in one slot may be diversely varied.

Figure 3:
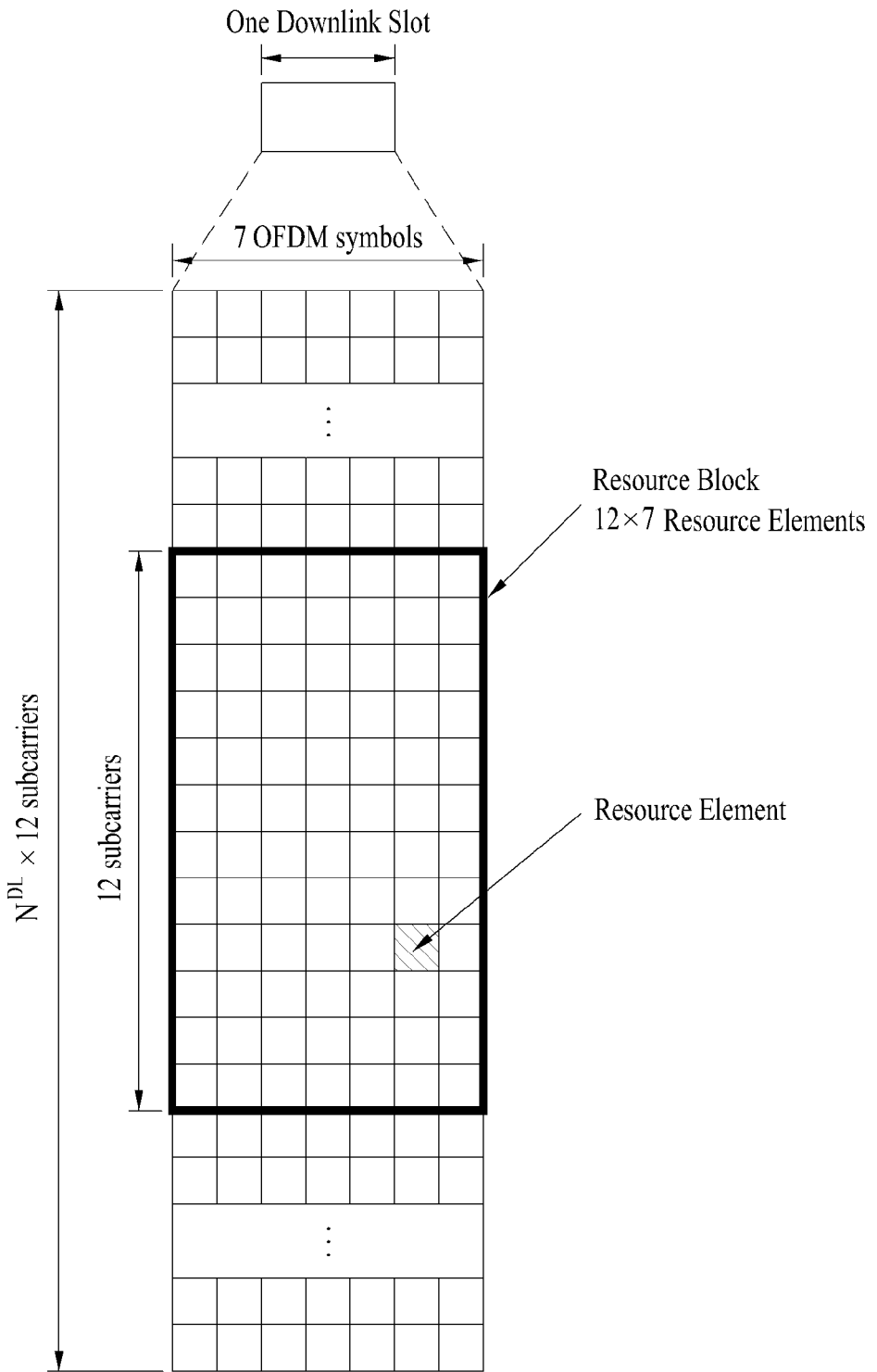
FIG. 3 illustrates an exemplary drawing of a resource grid with respect to one downlink slot.

FIG. 3 illustrates an exemplary drawing of a resource grid of a downlink slot. This corresponds to when the OFDM symbol is configured of a normal CR Referring to FIG. 3, one downlink slot includes a plurality of OFDM symbols in the time domain and includes a plurality resource blocks (RBs) in the frequency domain. Herein, although it is shown that one downlink slot includes 7 OFDM symbols in the time domain, and that one resource block (RB) includes 12 sub-carriers in the frequency domain, this is merely exemplary. And, therefore, the present invention will not be limited only to the example presented herein. Each element within the resource grid is referred to as a resource element (RE). For example, the resource element a(k,l) corresponds to a resource element located in the $k^{th}$ subcarrier and the $l^{th}$ OFDM symbol. In case of a normal CP, one resource block includes 12×7 resource elements. Since the interval between each subcarrier is 15 kHz, one resource block includes approximately 180 kHz in the frequency domain. $N^{DL}$ corresponds to a number of resource blocks included in a downlink slot. The value of $N^{DL}$ may be decided in accordance with a downlink transmission bandwidth determined by the scheduling of the base station.

Figure 4:
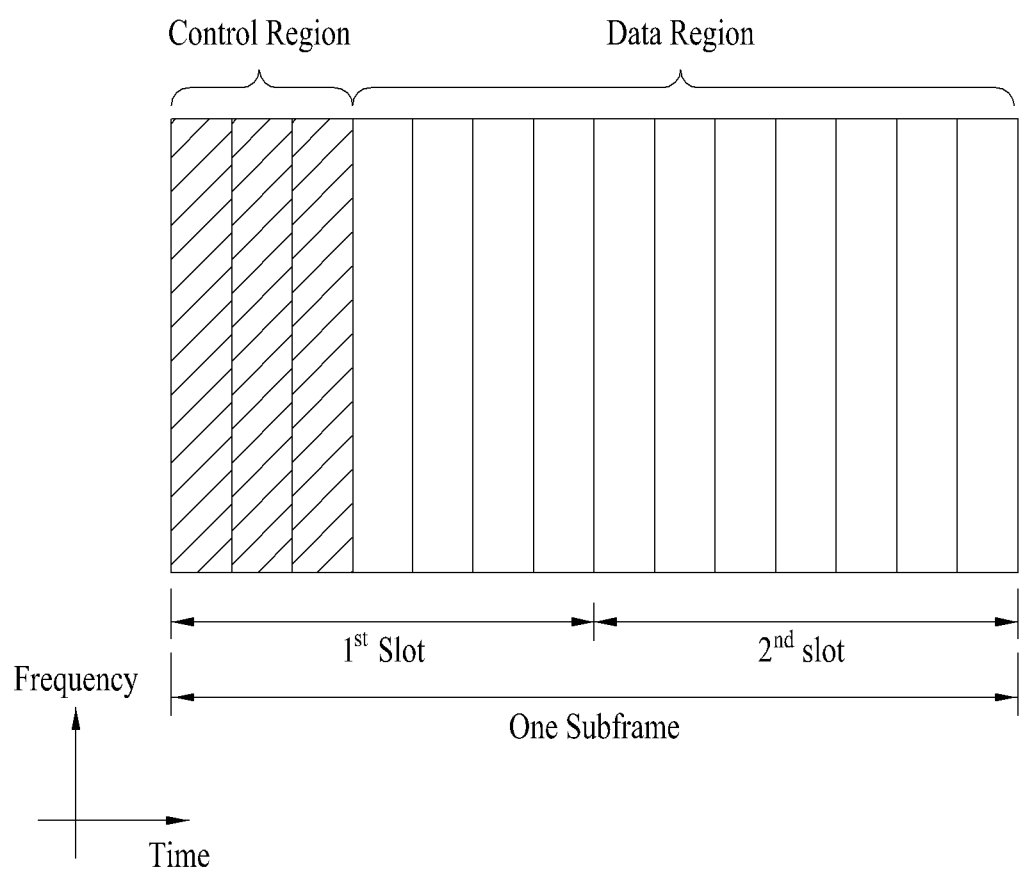
FIG. 4 illustrates a drawing showing a structure of a downlink subframe.

FIG. 4 illustrates a drawing showing a structure of a downlink subframe. In a subframe, a maximum of 3 OFDM symbols located at the front portion of a first slot within one subframe corresponds to a control region wherein a control channel is allocated (or assigned). The remaining OFDM symbols correspond to a data region wherein a Physical Downlink Shared Chancel (PDSCH) is assigned. Downlink control channels that are being used in the 3GPP LTE system may include a Physical Control Format Indicator Channel (PCFICH), a Physical Downlink Control Channel (PDCCH), a Physical Hybrid automatic repeat request Indicator Channel (PHICH), and so on. The PCFICH includes information on the number of OFDM symbols being transmitted from the first OFDM symbol of a subframe and being used in the control channel transmission within the subframe. As a response to an uplink transmission, the PHICH includes HARQ ACK/NACK signals. The control information being transmitted through the PDCCH is referred to as Downlink Control Information (DCI). Herein, the DCI may include uplink or downlink scheduling information or may include an uplink transmission power control command on a random terminal (or user equipment) group. The PDCCH may include information on resource allocation and transmission format of a downlink shared channel (DL-SCH), information on resource allocation of an uplink shared channel (UL-SCH), paging information of a paging channel (PCH), system information of the DL-SCH, resource allocation of an upper layer (or higher level) control message, such as a Random Access Response, that is being transmitted over the PDSCH, a set of transmission power control commands on individual user equipments within the random user equipment group, transmission power control information, information on the activation of a Voice over IP (VoIP), and so on. A plurality of PDCCHs may be transmitted within the control region. And, the user equipment may monitor the plurality of PDCCHs. Herein, the PDCCH may be transmitted in the form of a combination of at least one or more consecutive Control Channel Elements (CCEs). A CCE corresponds to a logical allocation unit used for providing a PDCCH at a coding rate based on a wireless channel state. Herein, the CCR corresponds to a plurality of resource element groups. The number of formats and available data bits of a PDCCH may be decided based upon a correlation between the number of CCEs and the coding rate provided by the CCEs. The base station decides a PDCCH format in accordance with the DCI being transmitted to the user equipment and adds a Cyclic Redundancy Check (CRC) to the control information. Depending upon the owner or purpose of the PDCCH, the CRC may be masked by a Radio Network Temporary Identifier (RNTI). If the PDCCH belongs to a particular (or specific) user equipment, a cell-RNTI (C-RNTI) identifier of the user equipment may be masked to the CRC. Alternatively, if the PDCCH belongs to a paging message, a Paging Indicator Identifier (P-RNTI) may be masked to the CRC. If the PDCCH belongs to a system information (more specifically, a system information block (SIB)), a system information identifier, and a system information RNTI (SI-RNTI) may be masked to the CRC. In order to indicate the random access response, which corresponds to a response to the transmission of a random access preamble, of the user equipment, a random access RNTI (RA-RNTI) may be masked to the CRC.

Figure 5:
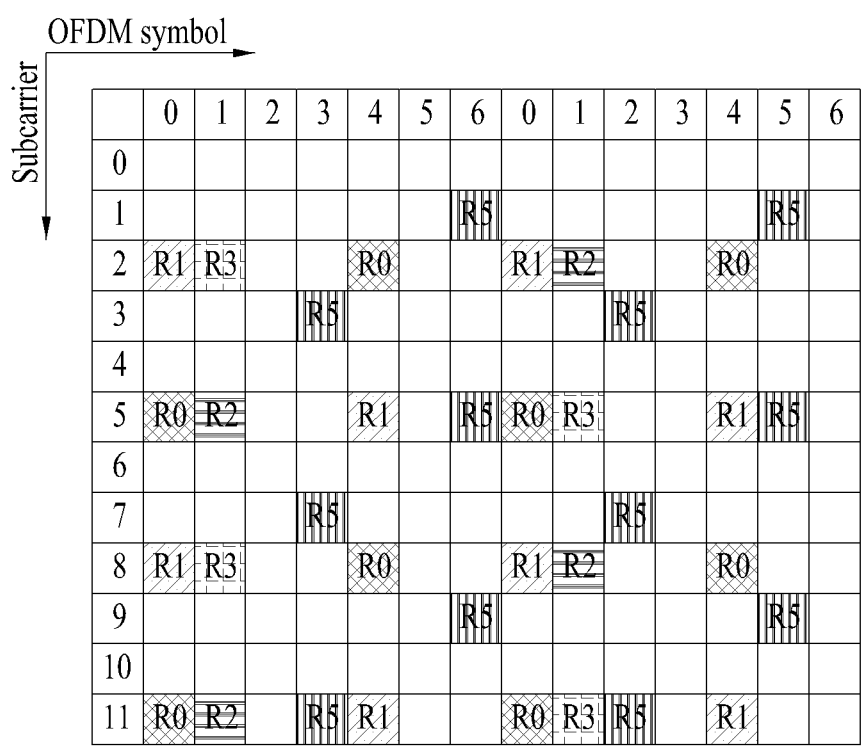
FIG. 5 illustrates patterns of a common reference signal (CRS) and a dedicated reference signal (DRS) in a 3GPP LTE system (e.g., release-8).

FIG. 5 illustrates patterns of a common reference signal (CRS) and a dedicated reference signal (DRS) in a 3GPP LTE system (e.g., release-8). The common reference signal (CRS) may also be referred to as a cell-specific reference signal, and the dedicated reference signal (DRS) may also be referred to as a UE-specific reference signal.

FIG. 5 corresponds to a drawing that describes a resource element to which the common reference signal and the dedicated reference signal are mapped, in case of a normal CP. Referring to FIG. 5, a horizontal axis signifies a time domain (OFDM symbol unit), and the vertical axis signifies a frequency domain (subcarrier unit). In case of the normal CP, with respect to a reference signal pattern, a basic resource block unit may consist of 14 OFDM symbols in the time domain and 12 subcarriers in the frequency domain. In case of an extended CP, a basic resource block unit for a reference signal pattern may consist of 12 OFDM symbols and 12 subcarriers. In the time-frequency domain shown in FIG. 5, the smallest square region may correspond to 1 OFDM symbol in the time domain and may correspond to 1 subcarrier in the frequency domain.

Referring to FIG. 5, Rp indicates a resource element, which is used for the transmission of a reference signal through a $p^{th}$ antenna port (or antenna port p). For example, R0 to R3 respectively indicate a resource element to which a common reference signal, the common reference signal being transmitted through $0^{th}$ to $3^{rd}$ antenna ports (or antenna ports 0 to 3), is mapped. And, R5 indicates a resource element to which a dedicated reference signal being transmitted through a $5^{th}$ antenna port (or antenna port 5), is mapped. The common reference signal being transmitted through antenna ports 0 and 1 are transmitted at an interval of 6 subcarriers (based on one antenna port) over $0^{th}$, $4^{th}$, $7^{th}$, and $11^{th}$ OFDM symbols (or OFDM symbols 0, 4, 7, and 11). And, the common reference signal being transmitted through antenna ports 2 and 3 are transmitted at an interval of 6 subcarriers (based on one antenna port) over $1^{st}$ and $8^{th}$ OFDM symbols (or OFDM symbols 1 and 8). The dedicated reference signal being transmitted at an interval of 4 subcarrier over $3^{rd}$, $6^{th}$, $9^{th}$, and $12^{th}$ OFDM symbols (or OFDM symbols 3, 6, 9, and 12) of each subframe. Therefore, a total of 12 dedicated reference signals are being transmitted with 2 chronologically consecutive resource blocks (or resource block pair) of a single subframe.

The common reference signal (CRS) (or cell-specific reference signal) is used for estimating a channel of a physical antenna end. And, herein, the common reference signal (CRS) corresponds to a reference signal that is being commonly transmitted to all user equipments (UE) within the corresponding cell. Channel information that is estimated by the user equipment through the common reference signal may be used for demodulating data, which are transmitted by using transmission methods, such as Single Antenna Transmission, Transmit Diversity, Closed-loop Spatial multiplexing, Open-loop Spatial multiplexing, Multi-User MIMO (MU-MIMO), and so on. And, the estimated channel information may also be used by the user equipment for estimating a channel and to perform reporting to the base station. In order to enhance channel estimation performance through the common reference signal, the position of the common reference signal for each cell within the subframe may be shifted differently. For example, when the reference signal is positioned at an interval of 3 subcarriers, one cell may be placed at an interval of 3k, and another cell may be placed at an interval of 3k+1.

The dedicated reference signal (DRS) (or a UE-specific reference signal) corresponds to a reference signal that is used for data demodulation. Accordingly, the dedicated reference signal may also be referred to as a demodulation reference signal (DMRS). When performing multi-antenna transmission, by directly applying a precoding weight, which is used for a specific user equipment, to the reference signal, an equivalent channel, which is configured of a combination of a precoding weight, which is transmitted from each transmission antenna when the user equipment has received a reference signal, and a transmission channel may also be estimated. Furthermore, the dedicated reference signal requires orthogonality between each transmission layers.

The conventional 3GPP LTE system supports a maximum of 4 transmission antennae transmission. And, a cell-specific reference signal for supporting a single transmission antenna, 2 transmission antennae, and 4 transmission antennae, and a UE-specific reference signal for Rank 1 Beamforming are defined in the conventional 3GPP LTE system. Meanwhile, the evolved version of the 3GPP LTE, i.e., an LTE-A (Advanced) system, is based on MIMO of a higher order, multiple-cell transmission, evolved multi-user MIMO, and so on. And, in order to perform efficient reference signal management and in order to support a more evolved transmission method, the LTE-A system is also based on dedicated reference signal based data demodulation. Furthermore, it may be preferable to set up the system so that the dedicated reference signal can exist only within a resource block and layer having a downlink transmission scheduled thereto by the base station.

When placing (or positioning) a dedicated reference signal, which is configured to support a maximum Rank 8 transmission being applied to the LTE-A system, over a radio resource, the dedicated reference signal for each layer may be multiplexed and positioned. Time Division Multiplexing (TDM) refers to aligning (or positioning) a dedicated reference signal for 2 or more layers over different time resources (e.g., OFDM symbols). Frequency Division Multiplexing (FDM) refers to aligning (or positioning) a dedicated reference signal for 2 or more layers over different frequency resources (e.g., subcarriers). Code Division Multiplexing (CDM) refers to multiplexing dedicated reference signals for 2 or more layers positioned over the same radio resource by using an orthogonal sequence (or orthogonal covering).

Hereinafter, a dedicated reference signal (DRS) pattern according to the exemplary embodiments of the present invention, which enables channel estimation and data recovery to be efficiently performed by a receiving end respective to a maximum Rank 8 transmission will be described in detail based upon the above-described details.

Demodulation Reference Signal (DMRS)

As described above, the design for a 3GPP LTE-A system supporting greater uplink/downlink transmission rates, as compared to the 3GPP LTE system, is currently under discussion. The 3GPP LTE-A system may support a maximum Rank 8 downlink MIMO transmission, and the 3GPP LTE-A system may perform data demodulation based upon the UE-specific DMRS. Accordingly, the design for a DMRS for supporting Rank 1 to Rank 8 transmission is also being required. Also, a DMRS for Rank 1 to Rank 2 transmission of the LTE-A system may be used for Dual-layer beamforming of 3GPP LTE Release-9. Prior to describing the DMRS that is used in 3GPP LTE-A downlink MIMO transmission, the DMRS that is used in the downlink MIMO transmission of the conventional 3GPP LTE system (release-8 or release-9) will first be described in detail.

The downlink MIMO transmission may also be supported by the 3GPP LTE system even before the 3GPP LTE-A system. In the downlink MIMO transmission of the 3GPP LTE release-8 system, precoded DMRS (also referred to as Dedicated RS (DRS) or UE-specific reference signal) based single layer beamforming may also be supported. When performing downlink transmission by using a precoded DMRS, since a precoding weight is already included in the channel information estimated by the receiving end through the precoded DMRS, the transmitting is not required to separately inform the receiving end of the information on the precoding weight. As an evolved format of the above-described single layer beamforming technique, the downlink MIMO transmission of the 3GPP LTE release-9 system may support a dual-layer (dual-stream) beamforming. The dual-layer beamforming technique corresponds to the MIMO transmission method supporting a maximum Rank 2 transmission based upon the precoded DMRS.

Hereinafter, a DMRS design for the LTE-A system and exemplary embodiments of the same described in detail.

A precoded reference signal may be used for a downlink MIMO transmission in the LTE-A system. And, with the usage of the precoded reference signal, a reference signal overhead may be reduced. Since the DMRS is precoded by the same precoder that is applied to the data, a precoding matrix is transparent to the user equipment. Therefore, it is only requested to transmit a DMRS corresponding to the layer, and precoding information is not required to be transmitted separately.

The DMRS overhead will now be described in detail. The DMRS overhead may be defined as a number of resource elements (REs) that are used for the DMRS for one resource block (e.g., a size corresponding to one subframe timewise x and 12 subcarriers frequency-wise) in each transmission rank.

For a Rank 1 transmission, 12 REs may be used for the DMRS in one resource block. This is identical to the overhead of a DMRS (antenna port index 5) in 3GPP LTE release-8.

For a Rank 2 transmission or higher, a maximum of 24 REs may be used for the DMRS in a single resource block. In case of Rank 2 transmission or higher, the same RE per antenna port may be used for the DMRS in each rank.

Additionally, the same DMRS pattern may be used regardless of the subframe type (TDD or FDD method). And, when using the same DMRS pattern regardless of the subframe type, the complexity in the operations of the user equipment may be reduced.

Hereinafter, details on the design of a DMRS for the LTE-A system will be described in detail in light of transmission mode independency, rank independency, subframe independency, and DMRS power boosting.

In a maximum 8 layer transmission of the LTE-A system, a UE-specific precoded DMRS is supported, thereby allowing a high spectrum efficiency (or bandwidth efficiency) requirement to be achieved. Since the DMRS is UE-specifically defined, it is required to first decide whether the DMRS should be optimized for each transmission mode, or whether the same DMRS should be used regardless of the transmission mode. In the aspect of complexity in the operation of the user equipment, it may be more advantageous to use a uniform DMRS that can perform demodulation operations regardless of the transmission mode. Furthermore, when considering joint optimization of single user MIMO (SU-MIMO), multiple user MIMO (MU-MIMO), and Cooperative Multi-Point (COMP) transmission and reception, it may be more advantageous to use the same DMRS regardless of the transmission mode with respect to the fact that flexible scheduling may be transparently available to the user equipment among various transmission modes. Therefore, as long as the performance is not affected, it may be preferable to use the same DMRS Pattern regardless of the transmission mode.

With respect to the fact that the user equipment may perform the same demodulation process in different transmission modes, such as the SU-MIMO, MU-MIMO, and CoMP transmitting and receiving techniques, it may be more advantageous to use the same DMRS pattern regardless of the rank. Herein, the usage of the same DMRS pattern regardless of the rank signifies that the DMRS patterns respective to each layer (e.g., time-frequency position and code) are identical to one another in all ranks. For example, a channel corresponding to layer index 1 may be estimated by the same channel estimator regardless of the rank. In other words, the usage of the same channel estimator regardless of the rank indicates that the DMRS pattern of a lower rank corresponds to a subset of the DMRS pattern of a higher rank. When the same DMRS pattern is used regardless of the rank, since the user equipment is capable of performing demodulation by using the same operation (or process steps) in all transmission modes, the complexity in the design of the user equipment may be reduced. Therefore, it may be advantageous to use a fixed DMRS pattern for each layer regardless of the rank.

In order to use a single DMRS Pattern regardless of the subframe type (FDD or FDD type) and to maintain community in the FDD type and the TDD type, it may be required to adequately decide the position of an OFDM symbol that is used for transmitting the DMRS. More specifically, settings may be made so that an OFDM symbol that is used as a guard period for a relay backhaul link (a link between the base station and a relay station), and a last OFDM symbol that is used for a synchronization channel transmission in the TDD type, cannot be used for DMRS transmission. Also, setting may be made so that an OFDM symbol, which includes a cell-specific reference signal (or a common reference signal), which is defined in 3GPP LTE release-8, cannot be used for DMRS transmission. This is because, when power boosting of the cell-specific reference signal is used (herein, reference signal power boosting refers to a case when, among the REs of a single OFDM symbol, an RE allocated for the reference signal brings power from another RE), and when a DMRS is transmitted over an OFDM symbol that is identical to the OFDM symbol over which the cell-specific reference signal is transmitted, the DMRS transmission power may be decreased, and the demodulation performance may be degraded. Therefore, it may be preferable to configure setting so that the DMRS cannot be transmitted in an OFDM symbol, to which a cell-specific reference signal and a guard period of a relay backhaul subframe are allocated.

As described above, the DMRS overhead may be decided as 12 REs in a single resource block respective to rank 1 transmission, and as a maximum of 24 REs in higher rank transmissions. However, the DMRS transmission shall also be considered as a DMRS overhead. When the DMRS for multiple layers are multiplexed by using a code division multiplexing (CDM) method, the DMRS transmission power is shared among multiple layers. Accordingly, as the number of layers increases, the channel estimation performance may be degraded. Therefore, the DMRS power boosting may also be considered.

Based upon the above-described details, a few methods that may be used as the DMRS pattern will hereinafter be proposed. As described above, in order to provide decreased complexity and enhanced flexibility in the operation of the user equipment, it may be considered in the present invention to multiplex a DMRS for multiple layers by using the CDM method.

Pattern-1 to pattern-4 of FIG. 6(a) to FIG. 6(d) correspond to candidates for CDM-based DMRS patterns that are used for supporting higher ranks.

In order to configure a fixed DMRS pattern for each layer regardless of the rank, the multiplexing process using the CDM method may only be applied in a CDM-group including 12 REs. Referring to FIG. 6(a) to FIG. 6(d), 'C' and 'D' indicate CDM-groups that can multiplex a maximum of 4 layers. The DMRS patterns shown in FIG. 6(a) to FIG. 6(d) may all satisfy the transmission mode independent and rank independent DMRS characteristics.

The DMRS pattern of FIG. 6(a) will be described as the most typical example. 12 REs that are marked as 'C' configure a single CDM-group. In a single CDM-group, 4 layers may be multiplexed by the CDM method by using Walsh covering. In other words, the DMRS for the 4 layers may be positioned over the same RE, and the DMRS for each layer may be differentiated from one another by using a CDM resource. For the $1^{st}$ layer (or layer 1), an orthogonal cover of (1, 1, 1, 1) is multiplied, for the $2^{nd}$ layer (or layer 2), an orthogonal cover of (1, −1, 1, −1) is multiplied, for the $3^{rd}$ layer (or layer 3), an orthogonal cover of (1, 1, −1, −1) is multiplied, and for the $4^{th}$ layer (or layer 4), an orthogonal cover of (1, −1, −1, 1) is multiplied. Alternatively, for example, when DMRSs for three (3) layers or less are multiplexed, among the 4 different orthogonal covers, 3 orthogonal covers or less may be randomly selected and used.

Figure 6:
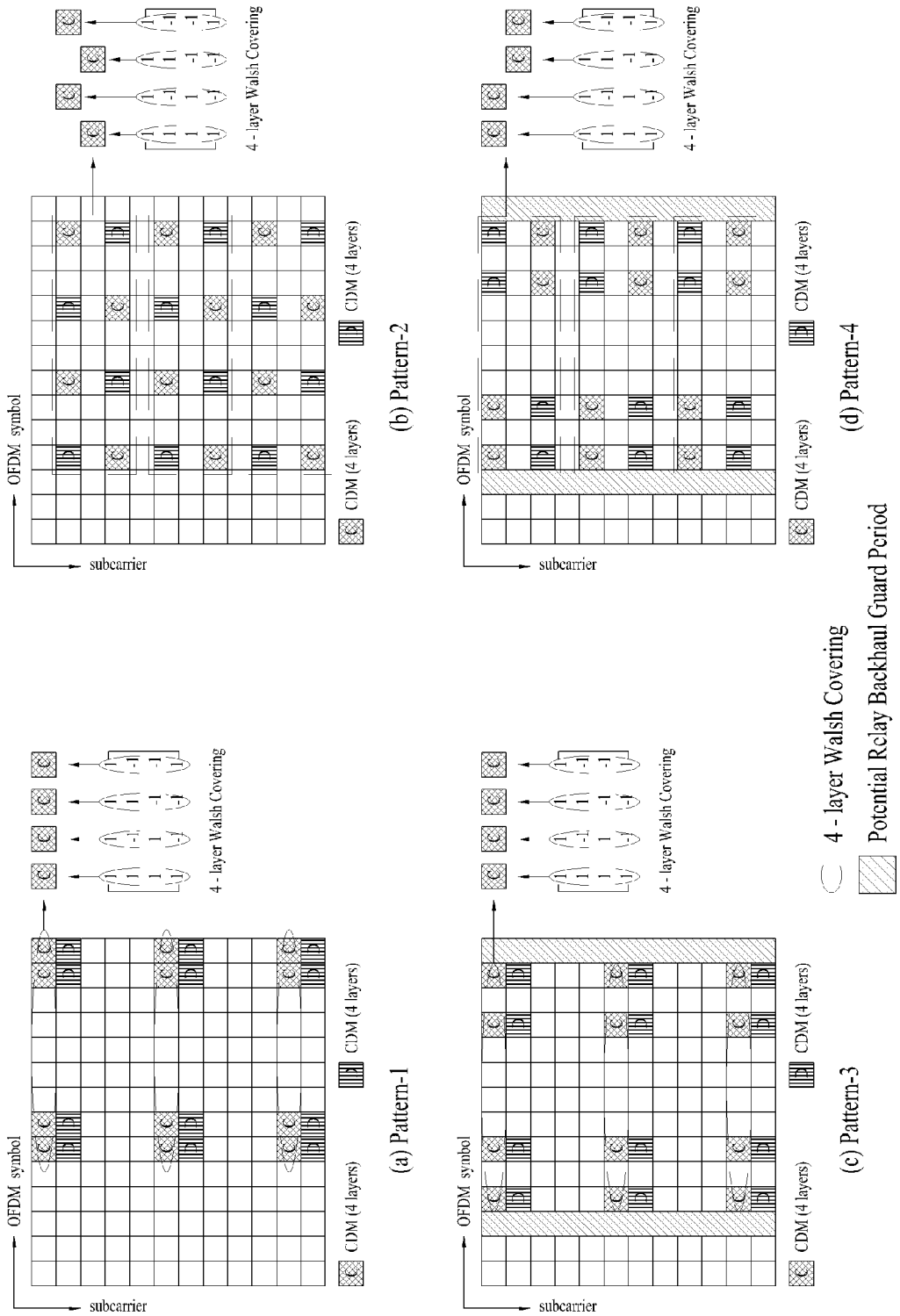
FIG. 6 illustrates examples of CDM based DMRS patterns.

In the DMRS pattern of FIG. 6, the DMRS overhead may vary depending upon the transmission rank. As shown in FIG. 6, in order to support a maximum of 8 layers, 2 CDM-groups may be used, and each CDM-group may support a maximum of 4 layers. Therefore, the DMRS overhead may be defined differently depending upon the number of CDM-groups. With respect to the above description, 2 methods may be taken into consideration.

First of all, settings may be made so that Rank 1 and Rank 2 may each have a DMRS overhead of 12 REs, and so that Ranks 3 to 8 may each have a DMRS overhead of 24 REs. When setting up the DMRS overhead as described above, Rank 1 and Rank 2 may be defined in one CDM-group, and 2 CDM-groups may be used starting from Rank 3. Therefore, in case of Rank 3 or higher, since robustness for a user equipment mobility may be increased in accordance with the usage of a large number of DMRSs, a moderately advantageous performance for lower ranks may be ensured.

Also, settings may be made so that Ranks 1 to 4 may each have a DMRS overhead of 12 REs, and so that Ranks 5 to 8 may each have a DMRS overhead of 24 REs. When setting up the DMRS overhead as described above, up to Rank 4 may be defined in one CDM-group, and, as compared to the above-described method in light of Ranks 3 and 4, the RS overhead may be reduced. However, in a high Doppler frequency situation, the channel estimation performance may be more degraded as compared to the above-described method.

In the 2 methods described above in relation to DMRS overhead settings, since the channel estimation performance and the RS overhead are related to a trade-off relation, adequate DMRS overhead settings are required to be made based upon such trade-off relation.

Multi User-MIMO (MU-MIMO)

As described above, in order to operate the MU-MIMO that is defined in a 3GPP LTE (e.g., release-8) system, each user equipment may perform data demodulation by using channel information received (or acquired) through the cell-specific reference signal and precoding weight information received (or acquired) through a control channel. When operating the MU-MIMO in a 3GPP LTE release-9 system and an LTE-A system, each having a DMRS that may support multi-layers designed therein, the base station may operate the MU-MIMO without any multi-user interference by using the channel information, which is received by the user equipment through the DMRS, without having to notify each user equipment of the precoding weight. Herein, for the correct operation of the user equipment, among the multi-layer channel information received from the DMRS, the layer corresponding to the information designated to a specific user equipment is required to be notified. Hereinafter, a method for designing the MU-MIMO for the 3GPP LTE release-9 system and the LTE-A system will be described in detail.

The 3GPP LTE release-9 system may support dual-layer beam-forming by using a UE-specifically precoded DMRS, wherein the dual-layer beam-forming corresponds to an extended format of the single layer beam-forming defined in the 3GPP LTE release-8 system. Accordingly, since up to 2 layers can be supported, an SU-MIMO using the precoded DMRS may be supported. In the SU-MIMO method using the precoded DMRS, since the precoder may be optimized in the base station by using a method transparent to the user equipment, such characteristic may provide a more favorable performance as compared to a codebook-based SU-MIMO method. Also, MU-MIMO support may be required in order to provide a greater system throughput in the 3GPP LTE release-9 system, and such MU-MIMO support may be realized by extending the dual-layer beam-forming range from the SU-MIMO to the MU-MIMO.

Hereinafter, with respect to the MU-MIMO method based upon dual-layer beam-forming in the 3GPP LTE release-9 system, factors, such as whether or not MU-MIMO is supported in dual-layer beam-forming, orthogonal DMRS or non-orthogonal DMRS, interference cancellation/suppression in the user equipment, minimization of the influence on the conventional standard documents, power sharing indicator, and so on, should be considered. Hereinafter, the above-mentioned factors that are to be considered will be described in detail. Also, the advantages in optimizing the MU-MIMO method by using the precoded dual-layer DMRS will also be described in detail.

In the 3GPP LTE release-8 system, since an SDMA (Spatial Division Multiple Access)-based MU-MIMO method using the precoded DMRS is supported, without any information on an interference channel, the system performance is comparatively low and the user equipment is incapable of cancelling or suppressing co-channel interference. Therefore, the 3GPP LTE release-8 system provides a rather limited performance due to the fact that the system performance is easily influenced by the antenna configuration and the scheduler. In order to reinforce the MU-MIMO method in the 3GPP LTE release-9 system, (as long as the influence of the conventional standard document is not significant) by allowing interference cancellation/suppression from the user equipment, it may be preferable to provide a more enhanced system performance and robustness.

When supporting single user dual-layer beam-forming, the usage of an orthogonal DMRS for supporting a more enhanced rank 2 transmission may be considered. Accordingly, if a performance gain can be acquired, it may be preferable to maximize the usage of the orthogonal DMRS that is already designed for the MU-MIMO. In order to enhance the performance of the MU-MIMO, increasing a Signal-to-Interference-plus-Notice Ratio (SINR) from the user equipment by cancelling and/or suppressing co-channel interference may be considered. Therefore, for a more enhanced performance, it may be preferable to use an orthogonal DMRS that allows interference channel estimation.

As described above, in the SDMA based MU-MIMO method of the 3GPP LTE release-8 system, the co-channel interference cannot be cancelled and/or suppressed in the user equipment. Therefore, the performance of the 3GPP LTE release-8 system is limited to a specific level. In order to allow interference cancellation, scheduling information, such as a Modulation and Coding Scheme (MCS), channel, and rank, of another co-scheduled user equipment is are required to be shared in the same Physical Resource Block (PRB). Accordingly, however, an excessive signaling overhead may occur. Also, when a co-scheduled user equipment is not allocated to the same PRB, the signaling overhead for interference cancellation may become more critical. Meanwhile, since interference suppression only requires interference channel information, as a method for reinforcing MU-MIMO in the 3GPP LTE release-9 system, interference suppression may be more adequate than interference cancellation. When the user equipment is aware of the presence of another user equipment that is interfering with the corresponding user equipment, and when the user equipment is also aware of a DMRS index that is associated with transmission block demodulation of the corresponding user equipment, an interference channel may be estimated by using the orthogonal DMRS. Therefore, it may be preferable to support interference suppression in the 3GPP LTE release-9 dual-layer MU-MIMO, and it may be preferable to provide control information associated with interference suppression (e.g., DMRS index respective to the corresponding user equipment and co-scheduling indicator). However, the issue of whether or not control information explicitly indicating the user equipment is required should be considered based upon the influence of the conventional standard document.

Among the control information associated with interference suppression, when a co-scheduling indicator is explicitly transmitted from each scheduled PRB in order to avoid scheduling restriction, the signaling overhead may be increased. In this situation, the CDM based DMRS may become the solution to the above-described problem. More specifically, this is because, when using the CDM based DMRS, without the need for separate signaling, the user equipment may detect co-channel interference with an orthogonal. DMRS by using energy detection from each of the scheduled PRBs. This is also because, when another interfering user equipment exists, an interference signal may be suppressed by each of the scheduled PRBs. Therefore, the DMRS indicator using the CDM-based orthogonal DMRS may minimize the influence of the standard document in order to support MU-MIMO. When a similar access method is applied to an SU-MIMO Rank 1 transmission, a PDCCH shared by both the SU-MIMO and the MU-MIMO may be used.

In the 3GPP LTE release-8 system, since a common reference signal (CRS) is cell-specifically, provided, when a QAM (Quadrature Amplitude Modulation) based modulation is used, power sharing information may be required for the demodulation process. However, when a UE-specific reference signal is used (since the UE-specific reference signal is not shared with other user equipments), the power sharing information is implicitly included in the reference signal. In this case, the user equipment may estimate that the RE from which data are transmitted and the RE from which the UE-specific reference signal is transmitted have the same power level. Therefore, the issue of whether or not DMRS power boosting is to be supported may be considered only in the aspect of enhancing the channel estimation performance, and this may equally apply to the case of SU-MIMO. Accordingly, for the MU-MIMO support, the power sharing indicator may not be specified.

Downlink Control Information Format (DCI Format)

Details on a downlink control information (DCI) format defined in the 3GPP LTE (e.g., release-8 or release-9) will now be described.

DCI format 1/1A includes information that is used in Rank 1 transmission, such as single stream transmission or transmission diversity transmission. DCI format 2A is used for a 2 codeword system, wherein a non-channel dependent (or open-loop) precoding is used.

The detailed contents of the DCT formats 1, 1A, and 2A are respectively shown in Tables 1, 2, and 3.

TABLE 1

| DCI format 1 | |
| --- | --- |
| Resource Allocation Header | 1 bit |
| Resource block assignment | N bits |
| Modulation and coding scheme | 5 bits |
| HARQ process number | 3 bits (FDD), 4 bits (TDD) |
| New data Indicator | 1 bit |
| Redundancy version | 2 bits |
| TPC command for PUCCH | 2 bits |
| Downlink Assignment Index | 2 bits |

TABLE 2

| DCI format 1A | |
| --- | --- |
| Flag for format 0/1A differentiation | 1 bit |
| Localized/Distributed VRB assignment Flag | 1 bit |
| Resource block assignment | N bits |
| Modulation and coding scheme | 5 bits |
| HARQ process number | 3 bits (FDD), 4 bits(TDD) |
| New data Indicator | 1 bit |
| Redundancy version | 2 bits |
| TPC command for PUCCH | 2 bits |
| Downlink Assignment Index | 2 bits |

TABLE 3

| DCI format 2A | |
| --- | --- |
| Resource allocation header | 1 bit |
| Resource block assignment | N bits |
| TPC command for PUCCH | 2 bits |
| Downlink Assignment Index | 2 bits |
| HARQ process number | 3 bits (FDD), 4 bits(TDD) |

TABLE 3-continued

| DCI format 2A | |
| --- | --- |
| Modulation and coding scheme (for transport block 1) | 5 bits |
| New data Indicator (for transport block 1) | 1 bit |
| Redundancy version (for transport block 1) | 2 bits |
| Modulation and coding scheme (for transport block 2) | 5 bits |
| New data Indicator (for transport block 2) | 1 bit |
| Redundancy version (for transport block 2) | 2 bits |
| Precoding Information | M bits |

The DCI format 2A, which is defined in the 3GPP LTE (e.g., release-8 or release-9) will be described in detail with reference to Table 3. The DCI format 2A corresponds to a control information format for channel-dependent (or open-loop) spatial multiplexing transmission. Herein, open-loop multiplexing transmission signifies that spatial multiplexing is realized without any feedback from the user equipment.

DCI format 2A supports a maximum of 2 codewords (transmission blocks), and the DCI format 2A defines an MCS (Modulation and Coding Scheme), NDI (New Data Indicator), and RV (Redundancy Version) for each transmission block. The MCS corresponds to information on modulations and coding methods used by the transmitting end. The NDI corresponds to a new data indicator indicating whether the transmitted data correspond to new data or re-transmitted data. And, in case the transmitted data correspond to re-transmitted data, the RV corresponds to redundancy version information indicating the specific subpacket that is being retransmitted.

The precoding Information field defined in DCI format 2A of Table 3 provides information on the transmission rank. As shown below in Table 4, when the transmission is performed by using 2 antenna ports, the precoding information field may be set to 0 bit (i.e., not present), and when the transmission is performed by using 4 antenna ports, the precoding information field may be set to 2 bits. In case of using 2 antenna ports, even though the precoding information is not provided, the user equipment may implicitly acquire (or receive) rank information through activation/non-activation of the transmission block. Accordingly, the activation of the transmission block may be directed by the MCS information and RV of the transmission block. For example, in DCI format 2A, when the MCS index value of the transmission value is set to 0, so as to indicate that the size of the transmission block is equal to 0, this may indicate that the transmission is not performed. Therefore, this may indicate that the corresponding transmission block is inactive (or non-active). When the size of the transmission block is not equal to 0, this may indicate that the transmission block is activated. Alternatively, when the MCS index value is set to 0, and when the RV is set to 1, this may indicate that the transmission block is activated. Therefore, when both of the 2 transmission blocks are activated, the user equipment may be aware that Rank 2 transmission is performed. And, when one of the 2 transmission blocks is activated and the other is non-activated, the user equipment may be implicitly aware that Rank 1 transmission is performed.

TABLE 4

| Number of antenna ports at eNode-B | Number of bits for Precoding Information |
| --- | --- |
| 2 | 0 |
| 4 | 2 |

Details on the precoding information field for 4 antenna ports may be defined as shown in Table 5 shown below.

TABLE 5

| One codeword:Codeword 0 enabled, Codeword 1 disabled | | Two codewords:Codeword 0 enabled, Codeword 1 enabled |
|---|---|---|
| Bit field mapped to index | Message | Bit field mapped to index |
| 0 | 4 layers: Transmit diversity | 0 |
| 1 | 2 layers: precoder cycling with large delay CDD | 1 |
| 2 | reserved | 2 |
| 3 | reserved | 3 |

As described above, when considering the DMRS based MIMO transmission, the overhead of the DMRS may be differently configured depending upon the transmission rank. For example, the DMRS for supporting Ranks 1 to 2 may be designed to maintain a consistent overhead, and when supporting Rank 3 or higher, the DMRS may be designed to have the increased overhead. Alternatively, the DMRS for supporting Ranks 1 to 4 may be designed to maintain a consistent overhead, and when supporting Rank 5 or higher, the DMRS may be designed to have the increased overhead.

When the overhead of the DMRS for Ranks 1 to 2 is to be maintained at a constant level, during the data transmission via DMRS-based dual-layer beam-forming of the 3GPP LTE release-9 system, the overhead of the DMRS may be consistently maintained. When the 3GPP LTE release-9 system supports MU-MIMO, a maximum of two user equipments may be multiplexed (herein each of the user equipment performs single layer transmission), and, considering the fact that the transmission correspond to a DMRS based MIMO transmission, since the base station transmits a DMRS, which is assumed to belong to Rank 2, even if MU-MIMO transmission is performed, a consistent DMRS overhead may always be maintained, and the same position over the resource block of the DMRS may also be always maintained. By indicating a specific layer of the two layers to the user equipment, which performs MU-MIMO transmission, the base station allows the corresponding user equipment to acquire (or receive) an orthogonal channel. As described above, when there is no change in the DMRS overhead or the position within the resource block of the DMRS, the MU-MIMO may be operated by using a layer indicator.

Meanwhile, with respect to a rank, which acts as a standard for varying the DMRS overhead or the position within the resource block of the DMRS, when a maximum rank supporting MU-MIMO is decided within a range exceeding the corresponding reference rank, a critical problem (or error) may occur during the data demodulation process of the user equipment performing MU-MIMO. For example, in case of Ranks 1 to 2, the DMRS may be multiplexed by using the CDM-group 'C' of FIG. 6(a) (i.e., by using 12 REs within a single resource block), and, in case Rank 3 or higher, the DMRS may be multiplexed by using both the CDM-groups 'C' and 'D' of FIG. 6(b) (i.e., by using 24 REs within a single resource block). In this case, it may be assumed that a DMRS is additionally assigned (or placed) in a position within the resource block of the DMRS supporting Ranks 1 to 2. At this point, when it is assumed that 3 user equipments each receiving a single layer transmission are multiplexed, so as to perform MU-MIMO, the base station uses the DMRS for supporting Rank 3 in order to perform data transmission. The user equipments that are respectively allocated with layer 1 and layer 2 (i.e., user equipment 1 (or $1^{st}$ user equipment) and user equipment 2 (or $2^{nd}$ user equipment)) receive (or acquire) a channel from Ranks 1~2 DMRS positions. And, the user equipment that is allocated with layer 3 (i.e., user equipment 3 (or $3^{rd}$ user equipment) receives (or acquires) a channel from the position of a DMRS, which is additionally allocated for Rank 3 DMRS. As described above, when the allocated layers are notified to each UE by using the layer indicator, the user equipments that are respectively allocated with layer 1/layer 2 (i.e., user equipment 1 and user equipment 2) may not even be capable of acknowledging the presence of layer 3. At this point, user equipment 1 and user equipment 2 may misunderstand the RE corresponding to the added DMRS position as being used for data transmission, instead of DMRS transmission. Therefore, when the DMRS overhead or the position within the resource block of the DMRS varies depending upon the corresponding rank, it is required to notify the user equipment that performs MU-MIMO of the maximum rank.

In order to notify the user equipment that performs MU-MIMO of the maximum rank, a Rank Indicator may be used.

In the SU-MIMO, the rank indicator indicates the rank of the current transmission. On the other hand, in the MU-MIMO, the rank indicator may be used for indicating the overall rank of the multiple users (or user equipments) that are multiplexed, or the rank indicator may be used for indicating the number of layer allocated to a specific user equipment.

More specifically, the rank indicator may be used for indicating a Total Transmission Rank of multiple user equipments that are multiplexed for MU-MIMO. For example, when M (M≥2) number of user equipments performing Rank N (N≥1) transmission exist, the base station may perform transmission at a total rank of K (K=N*M). At this point, the base station may notify through the rank indicator that a total of K rank transmission is currently being performed, and that a DMRS pattern for supporting Rank K is also currently being used. And, the user equipment may acknowledge the fact that a DMRS for supporting Rank K transmission has been used. According to the above-described method, even when a DMRS pattern or overhead varies depending upon the transmission rank, the user equipment may be capable of clearly distinguishing the RE that is used for the DMRS from the RE that is used for data. The user equipment may receive (or acquire) a channel of K number of layers through a Rank K DMRS. Herein, the user equipment may first identify the layer corresponding to its valid channel information by using the information received from the layer indicator, thereby receiving the correct channel.

For example, when the total transmission rank is equal to 3, the following description will be made under the assumption that a single user equipment supports Rank 1 transmission. Herein, it will also be assumed that, up to a total transmission rank 2, the base station transmits the DMRS through 12 REs within a single RB, and it will also be assumed that, in a Rank 3 transmission or higher, the base station transmits the DMRS through 24 REs within a single RB. If information on the total transmission rank is not notified to the user equipment performing MU-MIMO, the user equipment may misunderstand that data are being transmitted in positions other than the DMRS position respective to Rank 1 transmission (12 RE positions within a single RB, e.g., position 'C' of FIG. 6(a)). Therefore, since the user equipment performs data demodulation while assuming that data are being transmitted from the RE position (additional 12 RE positions within the single RB, e.g., position 'D' of FIG. 6(a)), through which the DMRS for another user equipment performing MU-MIMO, a problem of not being capable of correctly demodulating data may occur. Conversely, as described above, when the information on the total transmission rank is notified to the user equipment, in addition to the DMRS position that is valid to the corresponding user equipment, the user equipment may also be aware of the RE positions to which valid DMRS are allocated, and the user equipment may also be aware that data are not transmitted from the RE. Therefore, the user equipment may be capable of correctly differentiating the RE that is used for the DMRS from the RE that is used for data, thereby being capable of correctly performing data demodulation.

In case only a maximum Rank 1 transmission is allowed to be performed with respect to each user equipment performing MU-MIMO, the user equipment may receive (or acquire) a channel of a layer that is indicated by layer indicator.

Meanwhile, when a maximum rank P (P≥2) is allowed for each user equipment performing MU-MIMO transmission, and when multiple codeword transmission is allowed for each user equipment, the user equipment may receive the channel of P number of layers in accordance with an increasing order starting from a layer, which is indicated by the layer indicator. For example, when data transmission using a maximum of 2 layers is allowed, the channel of a layer being indicated by the layer indicator (e.g., layer index 1) and the channel of another layer corresponding to an order incremented by one from the corresponding layer (e.g., layer index 2) may be acquired. Meanwhile, when a 1 layer transmission is allowed in a situation where the maximum 2 layer transmission is allowed, the user equipment may recognize through other information that the current transmission corresponds to the Rank 1 transmission. For example, information on whether or not a codeword is activated may be implicitly received (or acquired) from MCS information, and so on, of each codeword (ref. Table 3 and Table 4 and the respective description). And, accordingly, the number of transmission layers may also be received (or acquired) by using the corresponding information. For example, when both of the 2 codewords are activated, the user equipment may recognize the current transmission as Rank 2 transmission, and, when only one of the 2 codewords is activated, the user equipment may recognize the current transmission as Rank 1 transmission.

Meanwhile, when a maximum Rank P (P≥2) transmission for each user equipment performing MU-MIMO operations is allowed, and when a single codeword transmission is allowed for each user equipment, the user equipment may receive a channel of P number of layers in accordance with an increasing order starting from a layer, which is indicated by the layer indicator.

In other words, the total transmission rank, information on a layer valid to each of the corresponding user equipments, and rank information respective to each of the corresponding user equipments may be provided to the user equipments, each performing MU-MIMO operation, by using the same resource.

Meanwhile, the following configurations associated to the rank indicator may be applied to the above-described exemplary embodiments of the present invention.

First of all, settings may be made so that up to a maximum of Rank 8 transmission can be indicated by using a 3-bit rank indicator.

Secondly, settings may be made so that up to a maximum of Rank 4 transmission can be indicated when a total rank, which is multiplexed for the MU-MIMO, is indicated by using a 2-bit rank indicator.

Thirdly, a 1-bit indicator indicating that a DMRS overhead or position is changed (or varied) may be used without having to configure the rank indicator. The 1-bit indicator may indicate whether or not an increase has occurred in the DMRS overhead or position by turning the indicator on/off.

When supporting the above-described MU-MIMO operations, with respect to the user equipment and the base station, a Codeword-to-Layer Mapping relation is required to be newly defined. This will be described in more detail with reference to Table 6 to Table 17 shown below Table 6 to Table 11 shown below correspond to codeword-to-layer mapping, when a maximum Rank P (P≥2) transmission for each user equipment performing MU-MIMO operations is allowed, and when a multiple codeword transmission respective to each users equipment is allowed. Each of Table 6 to Table 10 respectively indicate maximum transmission ranks 1, 2, 3, and 4 in the perspective of the base station. And, Table 10 and Table 11 indicate a codeword-to-layer mapping respective to the maximum reception ranks 1 and 2, in the perspective of the user equipment.

TABLE 6

| Max Tx Rank | Codeword to Layer mapping | |
|---|---|---|
| | Codeword | Layer |
| 1 | 1 (for $1^{st}$ UE) | 1 |

TABLE 7

| Max Tx Rank | Codeword to Layer mapping | |
|---|---|---|
| | Codeword | Layer |
| 2 | 1 (for $1^{st}$ UE) | 1 |
| | 1 (for $2^{nd}$ UE) | 2 |

TABLE 8

| Max Tx Rank | Codeword to Layer mapping | |
|---|---|---|
| | Codeword | Layer |
| 3 (case 1) | 1 (for $1^{st}$ UE) | 1 |
| | 1 (for $2^{nd}$ UE) | 2 |
| | 1 (for $3^{rd}$ UE) | 3 |
| 3 (case 2) | 1 (for $1^{st}$ UE) | 1 |
| | 1 (for $2^{nd}$ UE) | 2 |
| | 2 (for $2^{nd}$ UE) | 3 |

TABLE 9

| Max Tx Rank | Codeword to Layer mapping | |
|---|---|---|
| | Codeword | Layer |
| 4 (case 1) | 1 (for $1^{st}$ UE) | 1 |
| | 1 (for $2^{nd}$ UE) | 2 |
| | 1 (for $3^{rd}$ UE) | 3 |
| | 1 (for $4^{th}$ UE) | 4 |
| 4 (case 2) | 1 (for $1^{st}$ UE) | 1 |
| | 1 (for $2^{nd}$ UE) | 2 |
| | 1 (for $3^{rd}$ UE) | 3 |
| | 2 (for $3^{rd}$ UE) | 4 |
| 4 (case 3) | 1 (for $1^{st}$ UE) | 1 |
| | 2 (for $1^{st}$ UE) | 2 |
| | 1 (for $2^{nd}$ UE) | 3 |
| | 2 (for $2^{nd}$ UE) | 4 |

TABLE 10

| Max Rx Rank | Codeword to Layer mapping | |
|---|---|---|
| | Codeword | Layer |
| 1 | 1 | 1 |

TABLE 11

| Max Rx Rank | Codeword to Layer mapping | |
|---|---|---|
| | Codeword | Layer |
| 2 | 1 | 1 |
| | 2 | 2 |

Table 12 to Table 17 shown below correspond to codeword-to-layer mapping, when a maximum Rank P (P≥2) transmission for each user equipment performing MU-MIMO operations is allowed, and when a multiple codeword transmission respective to each user equipment is allowed. Each of Table 12 to Table 15 respectively indicate maximum transmission ranks 1, 2, 3, and 4 in the perspective of the base station. And, Table 16 and Table 17 indicate a codeword-to-layer mapping respective to the maximum reception ranks 1 and 2, in the perspective of the user equipment.

TABLE 12

| Max Tx Rank | Codeword to Layer mapping | |
|---|---|---|
| | Codeword | Layer |
| 1 | 1 (for 1$^{st}$ UE) | 1 |

TABLE 13

| Max Tx Rank | Codeword to Layer mapping | |
|---|---|---|
| | Codeword | Layer |
| 2 | 1 (for 1$^{st}$ UE) | 1 |
| | 1 (for 2$^{nd}$ UE) | 2 |

TABLE 14

| Max Tx Rank | Codeword to Layer mapping | |
|---|---|---|
| | Codeword | Layer |
| 3 (case 1) | 1 (for 1$^{st}$ UE) | 1 |
| | 1 (for 2$^{nd}$ UE) | 2 |
| | 1 (for 3$^{rd}$ UE) | 3 |
| 3 (case 2) | 1 (for 1$^{st}$ UE) | 1 |
| | 1 (for 2$^{nd}$ UE) | 2 |
| | | 3 |

TABLE 15

| Max Tx Rank | Codeword to Layer mapping | |
|---|---|---|
| | Codeword | Layer |
| 4 (case 1) | 1 (for 1$^{st}$ UE) | 1 |
| | 1 (for 2$^{nd}$ UE) | 2 |
| | 1 (for 3$^{rd}$ UE) | 3 |
| | 1 (for 4$^{th}$ UE) | 4 |
| 4 (case 2) | 1 (for 1$^{st}$ UE) | 1 |
| | 1 (for 2$^{nd}$ UE) | 2 |
| | 1 (for 3$^{rd}$ UE) | 3 |
| | | 4 |
| 4 (case 3) | 1 (for 1$^{st}$ UE) | 1 |
| | | 2 |
| | 2 (for 2$^{nd}$ UE) | 3 |
| | | 4 |

TABLE 16

| Max Rx Rank | Codeword to Layer mapping | |
|---|---|---|
| | Codeword | Layer |
| 1 | 1 | 1 |

TABLE 17

| Max Rx Rank | Codeword to Layer mapping | |
|---|---|---|
| | Codeword | Layer |
| 2 | 1 | 1 |
| | | 2 |

As shown in Table 11 to Table 17, the codeword-to-layer mapping relation, when the transmission corresponds to a maximum reception rank 2 in the perspective of the user equipment, may be used for initial transmission as well as for re-transmission when performing MU-MIMO transmission.

Figure 7:
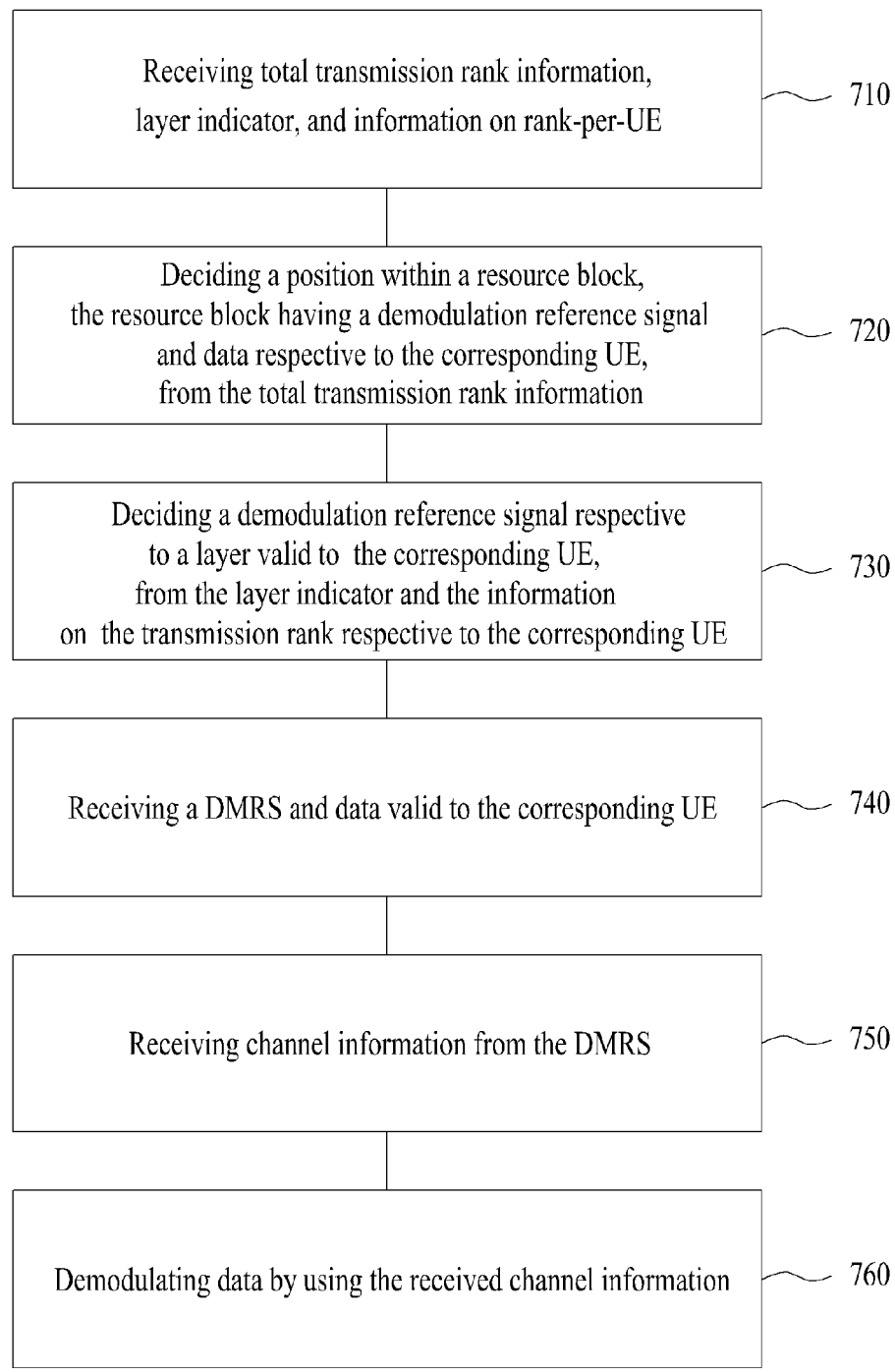
FIG. 7 illustrates a flow chart showing the process steps of a method of a user equipment for receiving a signal in a wireless communication system supporting multi-user MIMO transmission according to the present invention.

FIG. 7 illustrates a flow chart showing the process steps of a method of a user equipment for receiving a signal in a wireless communication system supporting multi-user MIMO transmission according to the present invention.

In step 710, the user equipment may use information on a total transmission rank of the multiple user MIMO transmission. Additionally, a layer indicator assigned to each user equipment and information on the rank In step 720, the user equipment may decide a demodulation reference signal (DMRS) for the corresponding user equipment and a position within a resource block (position within a time-frequency domain) to which data are transmitted.

In step 730, the user equipment may decide a demodulation reference signal (DMRS) respective to a layer, which is valid to the user equipment, from the layer indicator and information on the transmission rank of the corresponding user equipment.

In step 740, the user equipment may receive a DMRS and data that are valid to the corresponding user equipment. In step 750, the user equipment may receive channel information from the DMRS. In step 760, the user equipment may demodulate data from the received channel information.

Depending upon the method shown in FIG. 7, the user equipment may correctly receive a valid DMRS, and since the user equipment may be aware that data transmission is not performed in a DMRS position respective to another user equipment performing MU-MIMO operations, the user equipment may use the channel information received through the DMRS, so as to correctly perform data demodulation.

Figure 8:
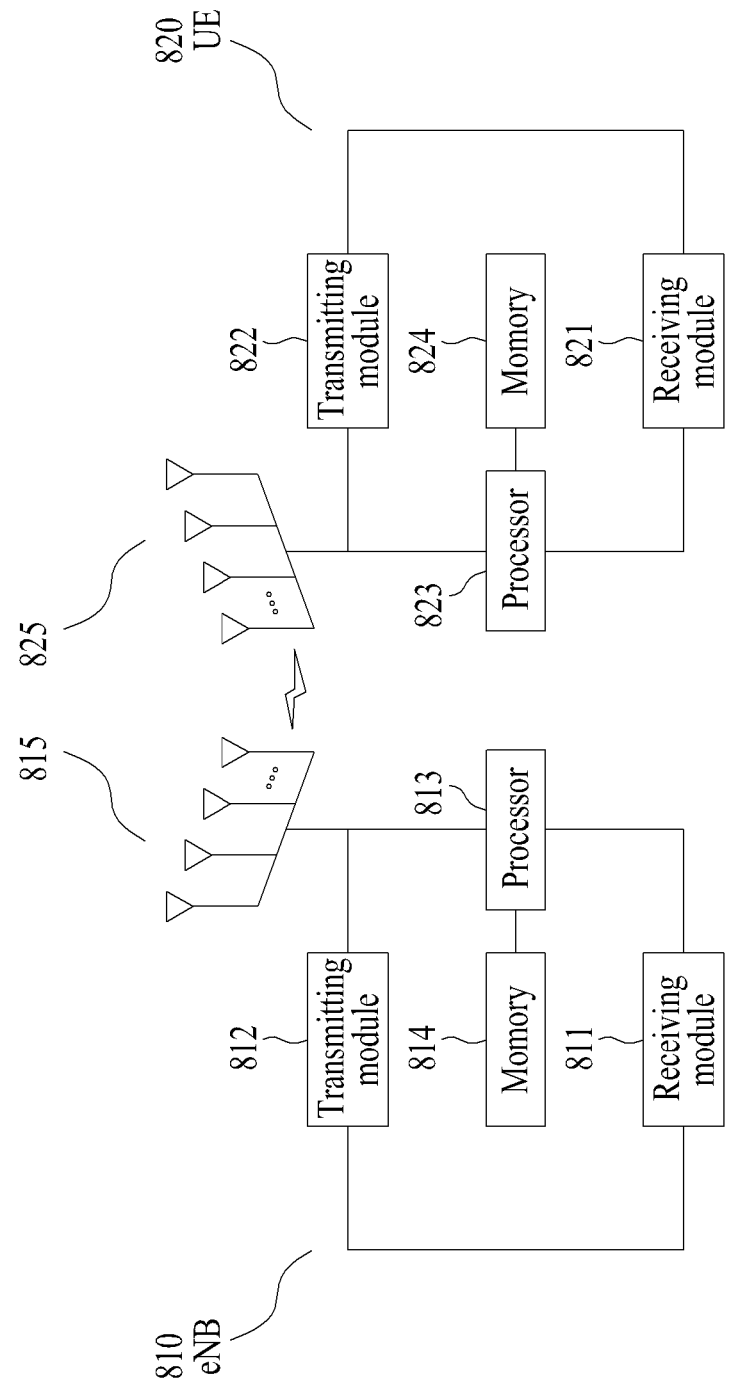
FIG. 8 illustrates a wireless communication system including a user equipment device and a base station device according to a preferred embodiment of the present invention.

FIG. 8 illustrates a wireless communication system including a user equipment device and a base station device according a preferred embodiment of the present invention.

The user equipment (UE) device (810) may include a receiving module (811), a transmitting module (812), a processor (813), a memory (814), and an antenna (815). The receiving module (811) may receive various types of signals, data, and information from the base station. The transmitting module (812) may transmit various types of signals, data, and information to the base station. The processor (813) may be configured to control the overall operations of the user equipment device (810), which includes the receiving module (811), the transmitting module (812), the memory (814), and the antenna (815). Herein, the antenna (815) may be configured of a plurality of antennae.

The processor (813) may control the user equipment, so that the user equipment can receive information on the total transmission ranks in a multi-user MIMO transmission through the receiving module (811), and so that the user equipment can receive a demodulation reference signal and data respective to the user equipment, based upon information on the total transmission ranks. Also, the processor (813) may receive (or acquire) channel information on the user equipment from the demodulation reference signal, so as to demodulate data based upon the received channel information.

Additionally, the processor (813) of the user equipment device may perform functions of operating and processing information received by the user equipment device, information that is to be transmitted outside the system, and so on. Furthermore, the memory (814) may store the operated and processed information for a predetermined period of time. Herein, the memory (814) may also be replaced by other components such as a buffer (not shown).

Meanwhile, the base station (eNB) device (820) may include a receiving module (821), a transmitting module (822), a processor (823), and a memory (824). The receiving module (821) may receive various types of signals, data, and information from the user equipment. The transmitting module (822) may transmit various types of signals, data, and information to the user equipment. The processor (823) may be configured to control the overall operations of the base station device (820), which includes the receiving module (821), the transmitting module (822), the memory (824), and the antenna (825). Herein, the antenna (825) may be configured of a plurality of antennae.

The processor (823) may be configured to control the base station, so that the base station can transmit information on the total transmission ranks in a multi-user MIMO transmission to the user equipment, and so that the base station can transmit a demodulation reference signal and data respective to the multiple users (or user equipments). The information on the total transmission ranks may be used for receiving the demodulation reference signal and data by the multiple users (or user equipments) and for receiving channel information from the demodulation reference signal, so as to demodulate data.

Additionally, the processor (813) of the base station device may perform functions of operating and processing information received by the user equipment device, information that is to be transmitted outside the system, and so on. Furthermore, the memory (824) may store the operated and processed information for a predetermined period of time. Herein, the memory (824) may also be replaced by other components such as a buffer (not shown).

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The above-described exemplary embodiments of the present invention may be applied to diverse mobile communication systems.

What is claimed is:

1. A method for receiving a signal by a user equipment in a wireless communication system supporting multi-user MIMO transmission, the method comprising:
receiving, by the user equipment from a base station, information on a total transmission rank of the multi-user MIMO transmission, wherein the total transmission rank indicates a summed value of transmission ranks of multiple users that are multiplexed for the multi-user MIMO transmission;
receiving, by the user equipment from the base station, demodulation reference signals and data for the user equipment based upon the information on the total transmission rank;
acquiring channel information for the user equipment from the demodulation reference signal; and
demodulating the data based upon the acquired channel information.

2. The method of claim 1, wherein the receiving the demodulation reference signals and data comprises:
deciding positions within a time-frequency domain, to which the demodulation reference signals and data for the user equipment are transmitted, from the information on the total transmission rank.

3. The method of claim 1, further comprising:
receiving, by the user equipment from the base station, a layer indicator allocated to the user equipment; and
receiving, by the user equipment from the base station, information on a transmission rank for the user equipment.

4. The method of claim 3, wherein the receiving demodulation reference signals and data comprises:
deciding demodulation reference signals for a layer valid to the user equipment, based upon the layer indicator and the information on the transmission rank for the user equipment.

5. A method for transmitting a signal by a base station in a wireless communication system supporting multi-user MIMO transmission, the method comprising:
transmitting, by the base station, information on a total transmission rank of the multi-user MIMO transmission to multiple users, wherein the total transmission rank indicates a summed value of transmission ranks of the multiple users that are multiplexed for the multi-user MIMO transmission; and
transmitting, by the base station, demodulation reference signals and data for each of the multiple users,
wherein the information on the total transmission rank is used by each of the multiple users for receiving the demodulation reference signals and the data, and for demodulating the received data by acquiring channel information from the demodulation reference signals.

6. The method of claim 5, further comprising:
transmitting, by the base station, a layer indicator allocated to each of the multiple users; and
transmitting, by the base station, information on a transmission rank for each of the multiple users.

7. A user equipment receiving a signal in a wireless communication system supporting multi-user MIMO transmission, the user equipment comprising:
a receiving module configured to receive a downlink signal from a base station;
a transmitting module configured to transmit an uplink signal to the base station; and
a processor configured to be connected to the receiving module and the transmitting module, so as to control operations of the user equipment including the receiving module and the transmitting module,
wherein the processor is further configured to:
control operations through the receiving module, to receive, from the base station, information on a total transmission rank of the multi-user MIMO transmission, wherein the total transmission rank indicates a summed value of transmission ranks of multiple users that are multiplexed for the multi-user MIMO transmission, and to receive, from the base station, demodulation reference signals and data for the user equipment based upon the information on the total transmission rank, and
control operations to acquire channel information for the user equipment from the demodulation reference signal, and to demodulate the data based upon the acquired channel information.

8. A base station transmitting a signal in a wireless communication system supporting multi-user MIMO transmission, the base station comprising:
a receiving module configured to receive an uplink signal from a user equipment;
a transmitting module configured to transmit a downlink signal to the user equipment; and
a processor configured to be connected to the receiving module and the transmitting module, so as to control operations of the base station including the receiving module and the transmitting module,
wherein the processor is further configured to:
control operations through the transmitting module, to transmit information on a total transmission rank of the multi-user MIMO transmission to multiple users, wherein the total transmission rank indicates a summed value of transmission ranks of the multiple users that are multiplexed for the multi-user MIMO transmission and to transmit demodulation reference signals and data for each of the multiple users,
wherein the information on the total transmission rank is used by each of the multiple users for receiving the demodulation reference signals and the data, and for demodulating the received data by acquiring channel information from the demodulation reference signals.

* * * * *